United States Patent Office 3,190,840
Patented June 22, 1965

3,190,840
METHOD OF PREPARING A CHROMIUM OXIDE AND ALPHA-ALUMINA CATALYST COMPOSITION AND THE PRODUCT THEREOF
Regine Biais, 22 Rue de Valmy, Charenton, France, Denis Papée, 6 Rue Adolphe Yvon, Paris 16, France, and Roland Gauguin, 201 Ave. de Neuilly, Neuilly-sur-Seine, France
No Drawing. Filed Aug. 9, 1960, Ser. No. 48,357
Claims priority, application France, Aug. 12, 1959, 802,673
7 Claims. (Cl. 252—465)

This invention relates to a new and improved catalytic agent and method for the manufacture of same and it relates more particularly to a catalyst composition for use, amongst other things, in the treatment of hydrocarbons and modification of the structures thereof.

It is well known that catalytic compositions for catalytic dehydrogenation of hydrocarbons can be produced by deposition of oxides of metals of the groups II, VIa and/or VIII of the periodic system of metals onto a carrier of aluminum oxide. Such catalytic agents are however, faced by the handicap that in addition to the desired dehydrogenation, cracking of the hydrocarbons occurs with the resultant formation of carbon which deposits onto the catalytic mass materially to interfere with the activity thereof. Regeneration of such catalytic material becomes difficult because of the high exothermicity of the composition reaction of the deposited carbon.

It is an object of this invention to produce and to provide a method for producing a catalytic composition or agent which is active in the dehydrogenation of paraffinic and/or olefinic, liquid and/or gaseous, and/or naphthenic hydrocarbons and/or in the cyclization of paraffinic and/or olefinic hydrocarbons such as in the formation of aromatic hydrocarbons and the like.

It is another object to produce and to provide a method for producing a catalyst which is capable of the described activity with hydrocarbons without causing cracking of the hydrocarbons thereby to avoid the formation of excessive amounts of carbon which would otherwise deposit onto the surfaces of the catalyst.

These and other objects and advantages of this invention will hereinafter appear from the following description which is given by way of illustration, but not by way of limitation.

It has been found, in accordance with the practice of this invention, that a catalytic composition capable of achieving the objectives described can be prepared of an aluminum oxide based catalyst in the form of an alpha solid solution of aluminum oxide-chromium oxide, in the rhombic form and which may be defined as presenting a true specific surface, measured by nitrogen absorption at $-195°$ C. of less than 50 m.$^2$/gr. and preferably 40 m.$^2$/gr. or less.

An important concept of this invention resides in the process of the preparation of the catalytic agent wherein, initially taken as a carrier for the chromium compound, use is made of aluminum oxide containing more than 10 percent by weight and preferably 20 or more percent by weight of aluminum oxide in the alpha modification. It has been found that the presence of alpha aluminum oxide enables the direct formation of the aluminum oxide-chromium oxide alpha solid solution catalyst in the desired rhombic form without having to go through the hexagonal modification, the transformation of which is extremely slow and difficult to realize.

The aluminum ovide may be provided in various form, such for example as a powder or in the form of the final catalyst, such for example as balls of a few millimeters in diameter, pellets, grains and the like. As the chromium compound, use can be made of a chromium oxide or a salt of chromium which is thermally decomposable to chromium oxide. The latter may be represented by sulfate, carbonate, chlorate, perchlorate, oxyhalides and oxyhalide derivatives of chromium, without the foregoing list being limiting, or in the form of a chromite, chromate and/or bichromate of a volatile cation such as ammonia or organic derivatives of ammonia, as represented by ammonium chromate or ammonium bichromate. The chromium component can be utilized in various forms, including a solid or liquid, such for example as in an aqueous solution.

In accordance with the concept of preparation, the aluminum oxide is impregnated or otherwise combined with the chromium compound in an amount corresponding to a few percent, calculated as chromium sesquioxide ($Cr_2O_3$) and preferably in an amount within the range of 2 to 25 percent and more particularly about 10 percent by weight of the catalytic composition.

After the aluminum oxide and the chromium containing compound have been processed to the shape desired for the final catalytic agent, it is dried and then subjected to calcination at elevated temperature to drive off volatile constitutents and form the aluminum oxide-chromium oxide alpha solid solution in the rhombic form. Calcination can be carried out at a temperature below 950° C. and preferably at a temperature within the range of 700–900° C. for a time ranging up to several hours, such as from one to six hours with a shorter time being applicable to the higher temperatures while a longer time is applicable for the lower temperatures. The desired calcination can be achieved at temperatures higher than 950° C., if desired.

By way of modification, the catalyst of this invention may be fabricated to include small quantities of a metal of groups Ia and/or IIb incorporated in whatever form, such as in the form of chromates, chromites and/or bichromates of such metal. The group IIb metals comprise zinc, cadmium and mercury. Such other metals are added in amounts less than a few tenths of the amount of chromium oxide contained in the catalyst.

The following examples are given by way of illustration, but not by way of limitation:

*Example 1*

Calcined aluminum oxide in the form of grains of about 3 millimeters, containing about 25 percent by weight of alpha aluminum oxide ($Al_2O_3$) and having a specific surface corresponding to about 60 m.$^2$/gr. is impregnated with a solution of ammonium bichromate containing 220 grams per liter $Cr_2O_7$ $(NH_4)_2$ and in amounts to provide a final product calculated to contain 8 percent by weight $Cr_2O_3$.

After impregnation, the material is dried for eight hours at 110° C. and then calcined for two hours at about 900° C. The catalytic composition obtained has the following analysis:

| | Percent by weight |
|---|---|
| $Al_2O_3$ | 92 |
| $Cr_2O_3$ | 8 |

Chromium sesquioxide is present in the catalytic composition substantially in the form of alpha aluminum oxide-chromium oxide solid solution and the specific surface of the catalyst is 45 m.$^2$/gr., or thereabouts.

In use, when a gaseous mixture consisting of 10 percent butene by volume and 90 percent nitrogen by volume is brought into contact with the catalytic agent prepared in accordance with Example 1 while at a temperature of 600° C. with a spatial speed of the order of 2.3 kg. of $C_4H_8$ per hour per liter, catalytic dehydrogenation of the butene to butadiene is obtained directly with a rate of conversion of the order of about 25 percent and an efficiency with reference to butadiene in excess of 95 percent. No formation of carbon resulting from cracking of the hydrocarbon was observed.

A similar catalyst prepared as described in Example 1 by calcination for two hours at 900° C. presents a surface of 80 m.²/gr. When this catalytic agent is employed for treatment of butadiene as described above, an efficiency of 75 percent conversion to butadiene is secured.

*Example 2*

Calcined aluminum oxide in the form of balls of 2 to 5 millimeters in diameter, containing about 40 percent by weight alpha–$Al_2O_3$ and having a specific surface of about 40 m.²/gr., is impregnated with a solution of ammonium bichromate and potassium bichromate in amounts to provide a final product containing 10 percent by weight of chromium sesquioxide.

The product obtained after impregnation is dried for eight hours at 110° C. and then calcined for four hours at 900° C. The catalyst obtained has the following composition:

| | Percent by weight |
|---|---|
| $Al_2O_3$ | 89 |
| $Cr_2O_3$ | 10 |
| $K_2O$ | 1 |

The chromium sesquioxide is present in the formed catalyst substantially in the form of alpha aluminum oxide-chromium oxide solid solution and the specific surface of the catalyst is about 30 m.²/gr.

When a gaseous mixture of butene and water vapor, consisting of 10 percent by volume butene and 90 percent by volume water vapor, is brought into the presence of the catalytic agent of Example 2 at a temperature of 650° C. and pressure of 70 mm of mercury, with a spatial speed in the order of 223 kg of $C_4H_8$ per hour per liter, dehydrogenation of butene to butadiene is directly obtained at a conversion rate in the order of 25 percent and an efficiency with reference to butadiene in excess of 75 percent with no observable formation of carbon by reason of the cracking of hydrocarbon.

It will be understood that changes may be made in the manner of form and preparation of the catalytic agent and in the use thereof without departing from the spirit of the invention, especially as defined in the following claims.

We claim:

1. A dehydrogenation catalyst for hydrocarbons which consists essentially of the calcined combination in the form of an alpha-solid solution of aluminum oxide containing at least 10% by weight of the alpha modification of aluminum oxide and 2–25% by weight calculated as chromium sesquioxide of a chromium compound selected from the group consisting of chromium oxide and compounds of chromium capable of thermal decomposition to chromium oxide, said catalyst being characterized by a rhombic form having a specific surface less than 50 m.²/per gram.

2. A method for preparing a dehydrogenation catalyst for hydrocarbons which comprises combining aluminum oxide containing at least 10% by weight of the alpha modification of aluminum oxide with a chromium compound selected from the group consisting of chromium oxide and compounds of chromium capable of thermal decomposition to chromium oxide, and calcining the combination at a temperature within the range of 700–950° C. to form directly an alpha solid solution of aluminum oxide and chromium oxide in rhombic form having a specific surface less than 50 m.²/per gram.

3. A method of preparing a dehydrogenation catalyst for hydrocarbons which comprises combining aluminum oxide containing at least 20% by weight of the alpha modification of aluminum oxide with a chromium compound selected from the group consisting of chromium oxide and compounds of chromium capable of thermal decomposition to chromium oxide and a salt of a metal selected from the group consisting of group Ia and group IIb of the periodic system, and then calcining the combination at a temperature within the range of 700–950° C. to form directly an alpha solid solution of aluminum oxide and chromium oxide in rhombic form having a specific surface than 50 m.²/per gram.

4. The process as claimed in claim 2 wherein the chromium compound is selected from the group consisting of a chromite, chromate and bichromate of a volatile cation.

5. The process as claimed in claim 2 wherein the amount of chromium compound incorporated with the aluminum oxide is from 2 to 25 percent by weight of the composition calculated as chromium sesquioxide.

6. The process as claimed in claim 3 in which the salt of a metal of the groups Ia and IIb is selected from the group consisting of chromite, chromate and bichromate of said metal.

7. The process as claimed in claim 3 in which the amount of salt of the metal of groups Ia and IIb is less than 20 percent of the chromium oxide in the catalyst.

References Cited by the Examiner

UNITED STATES PATENTS

| 2,311,979 | 2/43 | Carson et al. | 252—465 |
| 2,454,227 | 11/48 | Smith et al. | 252—463 X |
| 2,826,620 | 3/58 | Matuszak | 252—465 X |
| 3,032,514 | 5/62 | Malley et al. | 252—465 |
| 3,068,303 | 12/62 | Pattison | 252—465 X |

FOREIGN PATENTS 570,551    7/45    Great Britain.

MAURICE A. BRINDISI, *Primary Examiner.*

JULIUS GREENWALD, *Examiner.*